United States Patent [19]

Langkamp

[11] Patent Number: 5,641,033
[45] Date of Patent: Jun. 24, 1997

[54] HYDRAULIC POWER STEERING SYSTEM

[75] Inventor: Bernd Langkamp, Stuttgart, Germany

[73] Assignee: Mercedes-Benz AG, Stuttgart, Germany

[21] Appl. No.: 495,805

[22] Filed: Jun. 27, 1995

[30] Foreign Application Priority Data

Jun. 27, 1994 [DE] Germany ............... 44 22 385.4

[51] Int. Cl.⁶ .................................................. B62D 5/07
[52] U.S. Cl. ............................................. 180/422; 180/400
[58] Field of Search ................................. 180/403, 417, 180/421, 422, 428, 400

[56] References Cited

U.S. PATENT DOCUMENTS

| | | | |
|---|---|---|---|
| 4,417,640 | 11/1983 | Abe et al. | 180/422 |
| 4,552,240 | 11/1985 | Takeshima et al. | 180/422 |
| 4,838,376 | 6/1989 | Klein et al. | 180/422 |
| 4,856,608 | 8/1989 | Adams | 180/422 |
| 5,542,490 | 8/1996 | Kemshall et al. | 180/422 |

FOREIGN PATENT DOCUMENTS

| | | |
|---|---|---|
| 26 39 853 | 3/1978 | Germany. |
| 29 15 890 | 11/1980 | Germany. |
| 34 35 544 | 4/1985 | Germany. |
| 36 22 217 | 1/1988 | Germany. |
| 42 08 004 | 9/1993 | Germany. |
| 52-140546 | 10/1977 | Japan. |
| 57-138470 | 8/1982 | Japan. |
| 58-15578 | 1/1983 | Japan. |
| 58-120276 | 8/1983 | Japan. |
| 59-59572 | 4/1984 | Japan. |
| 60-193868 | 12/1985 | Japan. |
| 61-52206 | 4/1986 | Japan. |
| 63-219479 | 9/1988 | Japan. |
| 1-60978 | 4/1989 | Japan. |

*Primary Examiner*—Kevin Hurley
*Attorney, Agent, or Firm*—Evenson, McKeown, Edwards & Lenahan, P.L.L.C.

[57] ABSTRACT

A hydraulic power steering system has a servo valve which is arranged between the delivery and suction side of a hydraulic pump. The servo valve is open in the central or normal position and controls the pressure to at least one connection of a hydraulic servomotor. When an operating element of the power steering system is actuated, the servomotor serves to generate a servo positioning force which facilitates the adjustment of the operating element. The hydraulic pump has a drive which can be switched-off, or can be switched over to an extremely low capacity or standby operation, when no servo positioning force is required.

5 Claims, 8 Drawing Sheets

HYDRAULIC POWER STEERING SYSTEM

BACKGROUND AND SUMMARY OF THE INVENTION

The invention relates to a hydraulic power steering system having a servo valve which is arranged between the delivery and suction side of a hydraulic pump, is open in the central or normal position, and controls the pressure to at least one connection of a hydraulic servomotor. When an operating element of the power steering system is actuated, the hydraulic servomotor serves to generate a servo positioning force which facilitates the adjustment of the operating element. The hydraulic power steering system further has a controllable electric drive for the hydraulic pump.

Power steering systems are generally common in motor vehicles. The servo valve or the servo valve arrangement generally has two parallel throttle routes leading from the delivery side to the suction side of the hydraulic pump and having in each case an input throttle and an output throttle. Both the input throttle and output throttle assume an open position as long as no actuating forces, or only very little actuating forces, are or have to be applied manually at the steering wheel arranged as an operating element. Arranged between the input and the output throttle of each throttle route is a connection for one side of a servomotor which can be actuated in two directions. Pressure equilibrium occurs between these connections as long as the servo valve or the servo valve arrangement is in the central or normal position. As soon as a greater manual setting force acts on the steering wheel, the two throttle is adjusted in the closing direction with simultaneous another in such a way that, in the one throttle route, the input throttle is opened with simulatenously increased throttling of the output throttle while, in the other throttle route, the input throttle is adjusted in the closing direction with simultaneous opening of the output throttle. A greater or lesser pressure difference thus occurs in one direction or the other. This pressure difference depends on the direction of actuation of the steering wheel. In this manner, the servomotor can then facilitate the manual adjustment or control of the steering wheel.

In motor vehicles, the hydraulic pump of the power steering system is usually driven by the vehicle engine. An essentially constant hydraulic flow through the servo valve or the servo valve arrangement is guaranteed by means of an additional hydraulic flow control. This is true even at changing rotary speeds of the vehicle engine and correspondingly changing delivery flow from the pump. In such cases, a relatively high power is also required for the power steering system even when no servo positioning force is to be generated.

In principle it is also known, for example from German Patent document DE 36 22 217 A1, to drive the hydraulic pump electrically. This has the advantage that the drive of the pump can take place independently of the rotary speed of the vehicle engine. In this case, a control of the drive output matching the requirement can be achieved in that the electric motor is controlled in dependence on the hydraulic pressure on the delivery side of the hydraulic pump. This is because, in a servo valve arrangement which is open in the central or normal position, a comparatively high pressure only occurs on the delivery side of the hydraulic pump when the valve arrangement moves out of the central or normal position. Correspondingly, the pump drive can be controlled via a pressure sensor or the like.

It is known from German Patent document DE-A 26 39 853 to control the electric drive of the hydraulic pump of a power steering system in dependence on the turning movements of the steering wheel. The turning movements are recorded in a contactless manner using a rotary position transducer. The electric drive is switched-off when the steering wheel remains steady.

According to German Patent document DE-A 29 15 890, the electric drive of a hydraulic pump of a power steering system is controlled in dependence on the moment of manual force to be overcome at the steering wheel. For this purpose, a torque measuring member is arranged in the steering shaft.

A similar arrangement, in principle, is described in German Patent document DE 34 35 544 A1. Additionally, German Patent document DE 34 35 544 A1 provides for a servo valve arrangement to be dispensed with and, instead, for a pump to be provided. The pump can be driven in two conveying directions. Via the pump, depending on the requirement, one side or the other side of the servomotor can be pressurized.

German Patent document DE 42 08 004 A1 shows the possibility of combining the electric motor, pump and hydraulic reservoir of a power steering system to form a unit which is ready for installation.

Finally, hydraulic power steering systems are known in principle, in which the servo valve or the servo valve arrangement is closed as long as no servo positioning force is required. In this arrangement, the hydraulic pump can be controlled in dependence on the charging state of a hydraulic pressure accumulator which is provided on the input side of the servo valve or the servo valve arrangement. As soon as the steering wheel has to be controlled manually with a specific effort, the servo valve or the servo valve arrangement opens completely or partly, in order to generate a pressure difference. The pressure difference serves to generate the servo positioning force, at the connections of the servomotor. In these systems, the power requirement can indeed be considerably reduced because, in principle, power is only required for the drive of the pump when a servo positioning force is to be generated. However, it has proved to be difficult to achieve satisfactory control characteristics with servo valves or servo valve arrangements which are normally closed There is therefore needed an advantageous design concept for power steering systems of the above-described type.

These needs are met according to the present invention in that the electric pump drive can be controlled with a mechanically actuable electric switch arrangement whose actuating members can be controlled by movements of mechanical parts of the power steering system.

The present invention is based on the general concept that the entire mechanism of a power steering system has to be adjusted during assembly so that the mechanical elements serving to actuate the electric switch arrangement can likewise be adjusted during this assembly adjustment without any appreciable outlay, or can even inevitably be adjusted.

Other objects, advantages and novel features of the present invention will become apparent from the following detailed description of the invention when considered in conjunction with the accompanying drawings.

BRIEF DESCRIPTION OF THE DRAWINGS

FIG. 11 illustrates the control of the drive of a hydraulic pump of a power steering system in dependence on the setting speed of a steering wheel or the like.

DETAILED DESCRIPTION OF THE DRAWINGS

Figure 1:
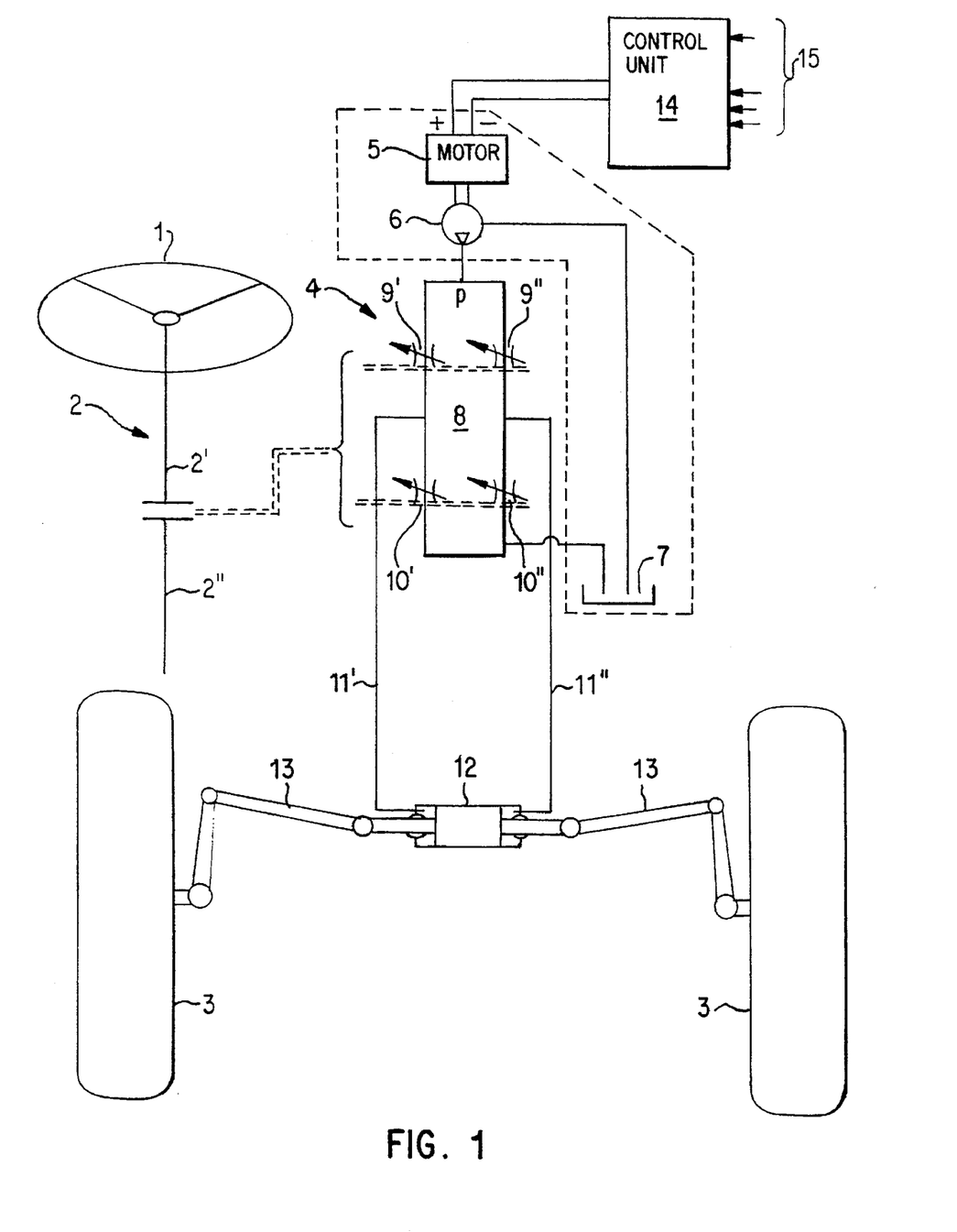
FIG. 1 is a schematic block diagram of a basic illustration of a motor vehicle.

In the power steering system illustrated in principle in FIG. 1, a steering wheel 1 is mechanically coupled as an operating element in terms of drive to the steered wheels 3 in a basically known manner using a steering shaft 2 and steering gear elements (not illustrated in detail), so that the steered wheels 3 can be deflected to the right or left by turning the steering wheel 1.

Arranged in the drive transmission between the steering wheel 1 and the steered wheels 3 are parts which are movable relative to one another to a limited extent under loading. These parts include, for example two steering-shaft parts 2' and 2", which are rotatable relative to one another to a limited extent, and a spring element (not illustrated), for example a torsion bar attempting to force the steering shaft parts 2' and 2" into a central position relative to one another. The extent of the relative movement of these parts 2' and 2" is dependent on the manual force acting on the steering wheel 1. Otherwise, the relative movement of the parts 2' and 2" is utilized for controlling a servo system 4.

This servo system 4 has a hydraulic pump 6 which is driven by an electric motor 5 and is connected on a suction side to a hydraulic reservoir 7 and on the delivery side to a servo valve arrangement 8. The servo valve arrangement 8, on the output side, again leads to the reservoir 7. The servo valve arrangement 8 has two parallel throttle routes with the controllable input throttles 9' and 9" and the likewise controllable output throttles 10' and 10" The input and output throttles 9' and 10' and 9" and 10" of each throttle route are normally open and are controlled in opposite directions to one another, i.e. if the input throttle 9' or 9" is opened, for example, the respective output throttle 10' or 10" is increasingly closed. Otherwise, the two throttle routes are controlled in opposite directions to one another, i.e. if, for example, the input throttle 9' is increasingly closed, the input throttle 9 is increasingly opened and, at the same time, the output throttle 10' is increasingly opened and the output throttle 10" is increasingly closed. Between the input throttle 9' or 9" and the output throttle 10' or 10" of each throttle route, a connection 11' or 11" in each case for one side of a hydraulic servomotor 12 branches off. The connection 11 or 11' is designed in the example illustrated as a twin-action piston cylinder member which is coupled in terms of drive to the steered wheels 3 through track rods 13 or the like for assisting steering movements.

When the pump 6 is operating, and all the throttles 9' to 10" assume their normal position, hydraulic medium flows through both throttle routes in the same manner, i.e. symmetrically, with the consequence that there is pressure equilibrium at the connections 11' and 11" of the servomotor 12, and the servomotor 12 does not generate any resulting force, but remains movable in a passive manner. This passive mobility of the servomotor 12 also remains intact when the pump 6 is stopped by switching off the electric motor 5 or when the pump 6 operates with an extremely low conveying capacity due to appropriate control of the electric motor 5. These operating states, which are possible in the invention, are explained further below.

If the throttle routes are now adjusted in opposite directions to one another while the pump 6 is operating, a correspondingly large pressure difference occurs at the connections 11' and 11" of the servomotor 12. This causes the servomotor 12 to generate a force which is effective for steering and facilitates the manual adjustment of the steering wheel 1 in the respective direction of actuation.

According to the present invention, provision is made for the electric motor 5 and, correspondingly, the hydraulic pump 6 to operate at a higher capacity only when the generation of a servo force by the servomotor 12 is actually desired. This servo force facilitates the actuation of the steering wheel 1. As long as no servo force is required, the electric motor 5 is switched-off or switched to a very low capacity (so-called "standby" operation) so that the pump 6 is likewise not operating or operating at a very low capacity. The control of the electric motor 5 takes place via a control unit 14 to which the electric motor 5 is electrically connected and which can be connected on the input side to various signal lines 15 in order to be able to take account of various parameters in the control of the motor 5.

Various embodiments for the control of the electric motor 5 are explained below.

Figure 2:
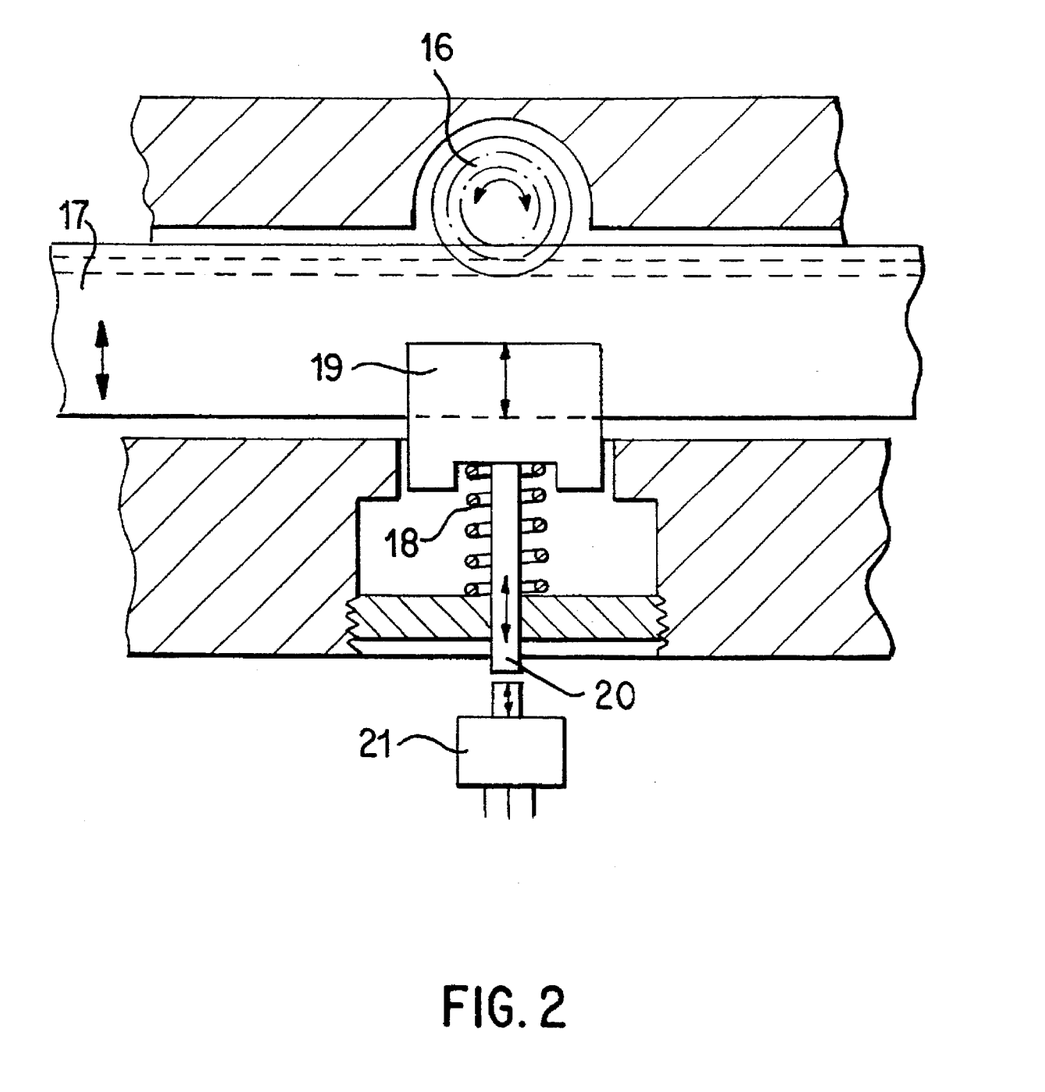
FIG. 2 shows a load-dependent control of the hydraulic pump of the power steering system via a resiliently guided toothed rack.

In the example of FIG. 2, the steering wheel (not illustrated) is connected in terms of drive via the steering shaft (likewise not illustrated) to a pinion 16. The pinion 16 has oblique teeth, as is known in the art, and meshes with a toothed rack 17 which correspondingly has oblique teeth and is, in turn, coupled to the steered wheels of the vehicle via track rods or the like. The toothed rack 17 is braced against the pinion 16 by a pressure piece 19. The pressure piece 19 is acted upon by a compression spring 18 in order to keep the teeth in engagement without backlash. In dependence on the forces transmitted between the pinion 16 and the toothed rack 17, the toothed rack 17 yields to a greater or lesser extent to the force of the compression spring 18 (the engagement of the teeth of the pinion 16 and the toothed rack 17 naturally remaining intact). A ram 20 arranged on the pressure piece 19 can, if required, thus actuate a switch 21 by which the electric motor 5 (FIG. 1) is connected to a source of electricity and is thus switched-on. If, in contrast, only small forces or no forces are acting between the pinion 16 and the toothed rack 17, the toothed rack 17 assumes a position remote from the switch 21. In this remote position, the switch 21 remains unactuated and the electric motor 5 remains switched off.

In this manner, the electric motor 5 and the hydraulic pump 6 (FIG. 1) only operate by means of the switch 21 when a greater force is required to actuate the steering wheel 1, and assistance by the servomotor 12 is thus desired.

Figure 3A:
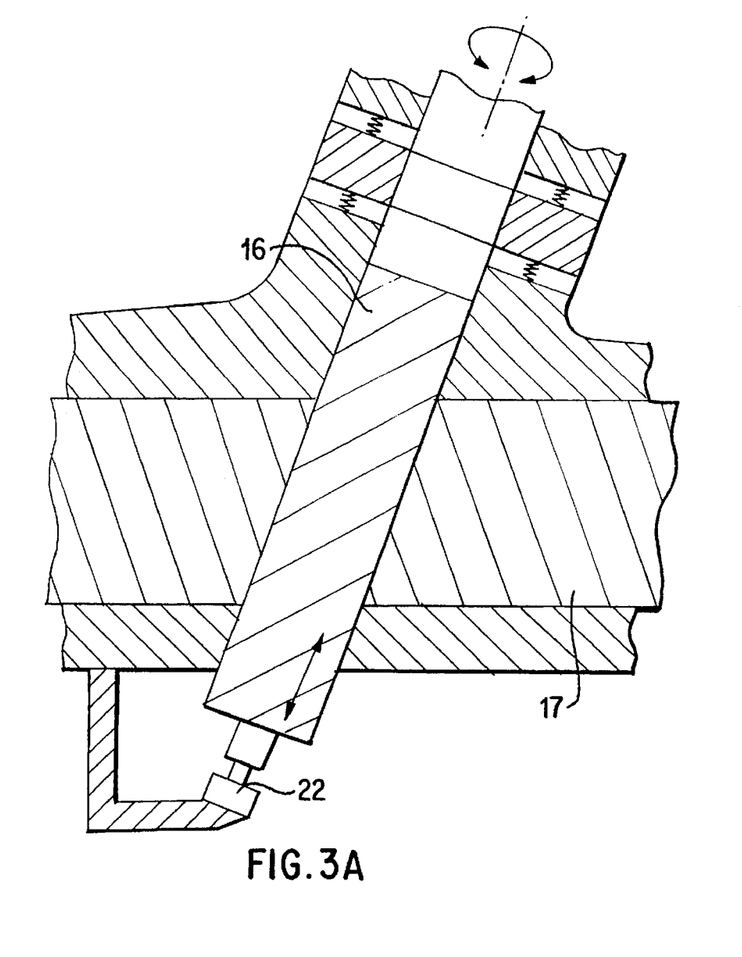
FIGS. 3A and 3B show load-dependent control using an axially resilient pinion.
Figure 3B:
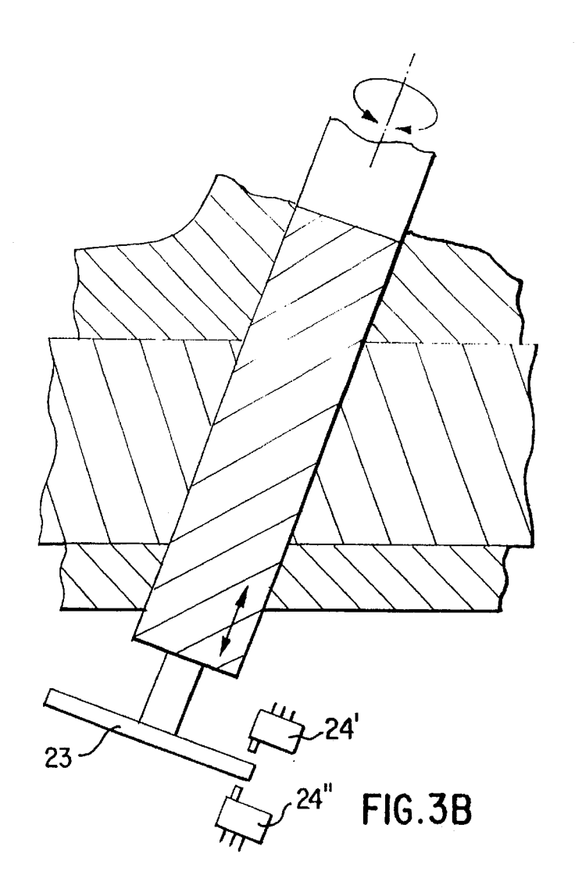

The example of FIGS. 3A and 3B differs from the embodiment according to FIG. 2 in that the pinion 16 is mounted so as to be axially resilient.

In example A of FIG. 3A, the pinion 16 is coupled in terms of drive via a contact pin to a switch 22. In an axial central position of the pinion 16, the switch 22 assumes its switched-off state and, when the pinion 16 is displaced out of the central position, the switch 22 assumes its switched-on state and thus switches the electric motor 5 (FIG. 1) on or off.

Since the axial central position of the pinion 16 is only assumed when no forces, or at the most small forces, are acting between the pinion 16 and the toothed rack 17, the electric motor 5 and thus the hydraulic pump 6 are in turn only switched on when a specific manual force is effective on the steering wheel 1 connected in terms of drive to the pinion 16.

The example B of FIG. 3B corresponds to a very large extent to the example A of FIG. 3A. Differing from the example A, provision is merely made for an actuating disc 23 to be arranged on the pinion 17. The actuating disc 23 is axially immobile relative to the pinion 16 and, when the pinion 16 is displaced axially out of its central position, the disc 23 actuates either a switch 24' or a switch 24". These two switches 24' and 24" are arranged electrically in parallel and, in the actuated state, connect the electric motor 5 (FIG. 1) to a source of electricity.

Figure 4:
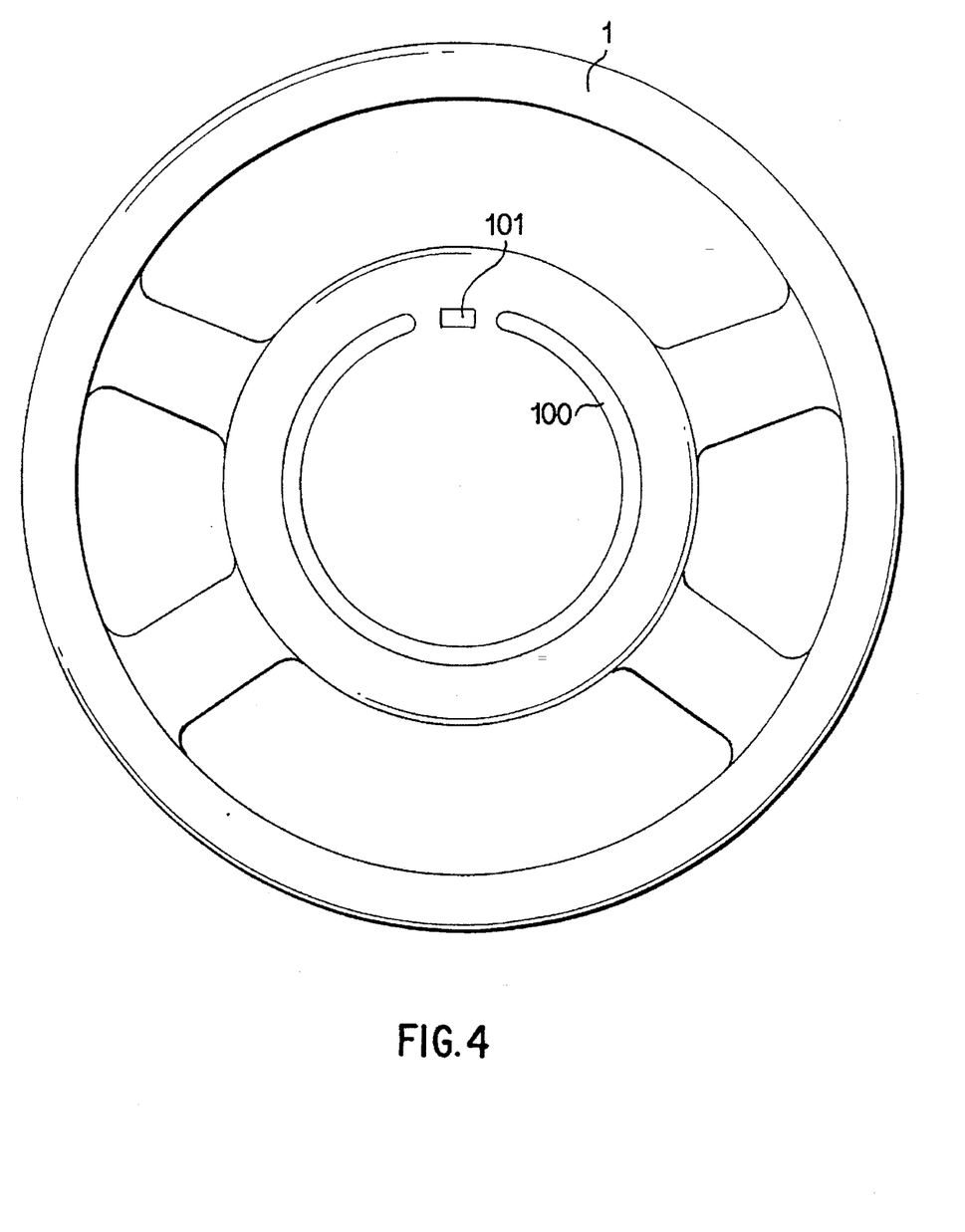
FIG. 4 illustrates a path-dependent control of the hydraulic pump of the power steering system using a sliding contact arrangement on the steering wheel.

In the designs of FIGS. 2 to 4, the switches 21, 22 and 24' and 24" can also be arranged in each case as signal transmitters for the control unit 14 of FIG. 1, so that the control unit 14 then switches on the electric motor 5—if required taking account of further parameters—or switches it over to increased capacity.

In the example of FIG. 4, a C-shaped slip ring 100 is arranged on the hub of the steering wheel 1. The slip ring 100 interacts with a fixed sliding contact 101 and closes an electrical path to the electric motor 5 (FIG. 1) or to the control unit 14 when the steering wheel 1 is deflected out of its central position in which the sliding contact 101 has no contact with the slip ring 100. Consequently, the motor 5 only operates at a high capacity when the steering system is adjusted out of the straight-ahead position.

Figure 5:
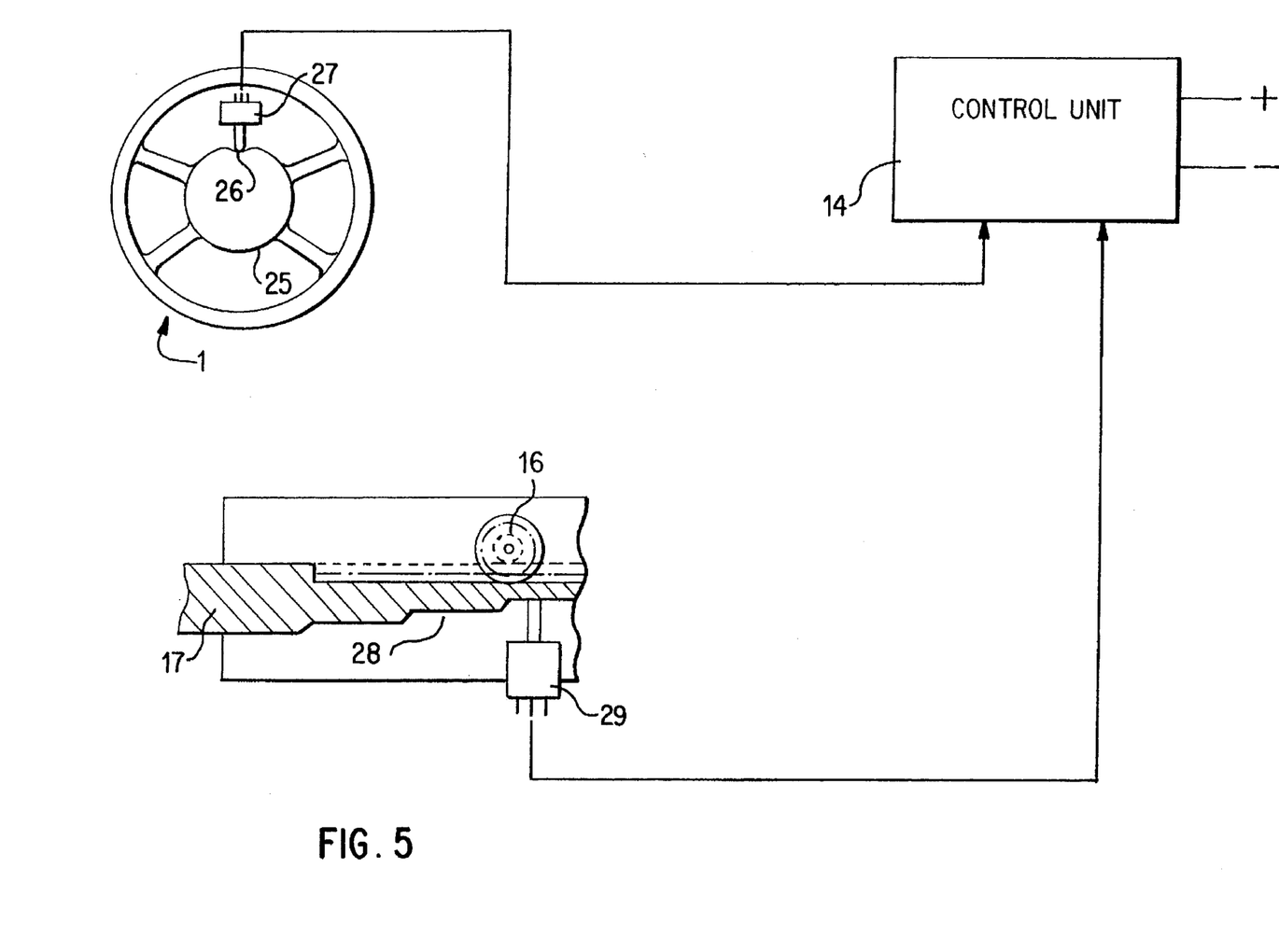
FIG. 5 is a block diagram showing a path-dependent control in dependence on the adjustment of a toothed rack.

In the example of FIG. 5, the steering wheel 1 is again connected in terms of drive to the pinion 16 which, in turn, meshes with the toothed rack 17.

An annular rim 25 having a radial recess 26 is arranged on the hub of the steering wheel 1. This rim 25 interacts with a switch 27 in the manner of a cam disc such that the switch 27 gives off a signal, for example only when the ram-like actuating member of the switch 27 slides up onto the circular circumference of the rim 25 outside the recess 26 when the steering wheel 1 is turned and the rim 25 turns along with it. The position of the recess 26, illustrated in FIG. 5, relative to the switch 27 is assumed when the vehicle steering system is in the straight-ahead position.

The toothed rack 17 has on one side a stepped recess 28 which interacts with the ram-like actuating member of a further switch 29. The switch 29 can assume a different number of switching positions corresponding to the number of steps, and then correspondingly generates different signals. The position of the recess 28, illustrated in FIG. 5, relative to the switch 29 is assumed when the steering system is in the straight-ahead position. If, by contrast, the steering system has been turned to a greater or lesser extent to the right or left, the ram-like actuating member of the switch 29 glides to a corresponding extent onto the steps of the recess 28, and the switch 29 is correspondingly actuated.

The signals of the switches 27 and 28 are fed to the control unit 14. When the switch 27 is actuated, i.e when its ram-like switching member leaves the recess 26, the control unit switches the electric motor 5 (FIG. 1) over from the completely switched-off state, or a state with extremely low capacity, to a state of low capacity. This state is then increased when the ram-like actuating member of the switch 29 is increasingly displaced by the steps of the recess 28 and the switch 29 generates corresponding signals.

In this manner, a capacity control of the electric motor 5, which is dependent on the setting path, and thus of the hydraulic pump 6 (FIG. 1) is possible.

Figure 6:
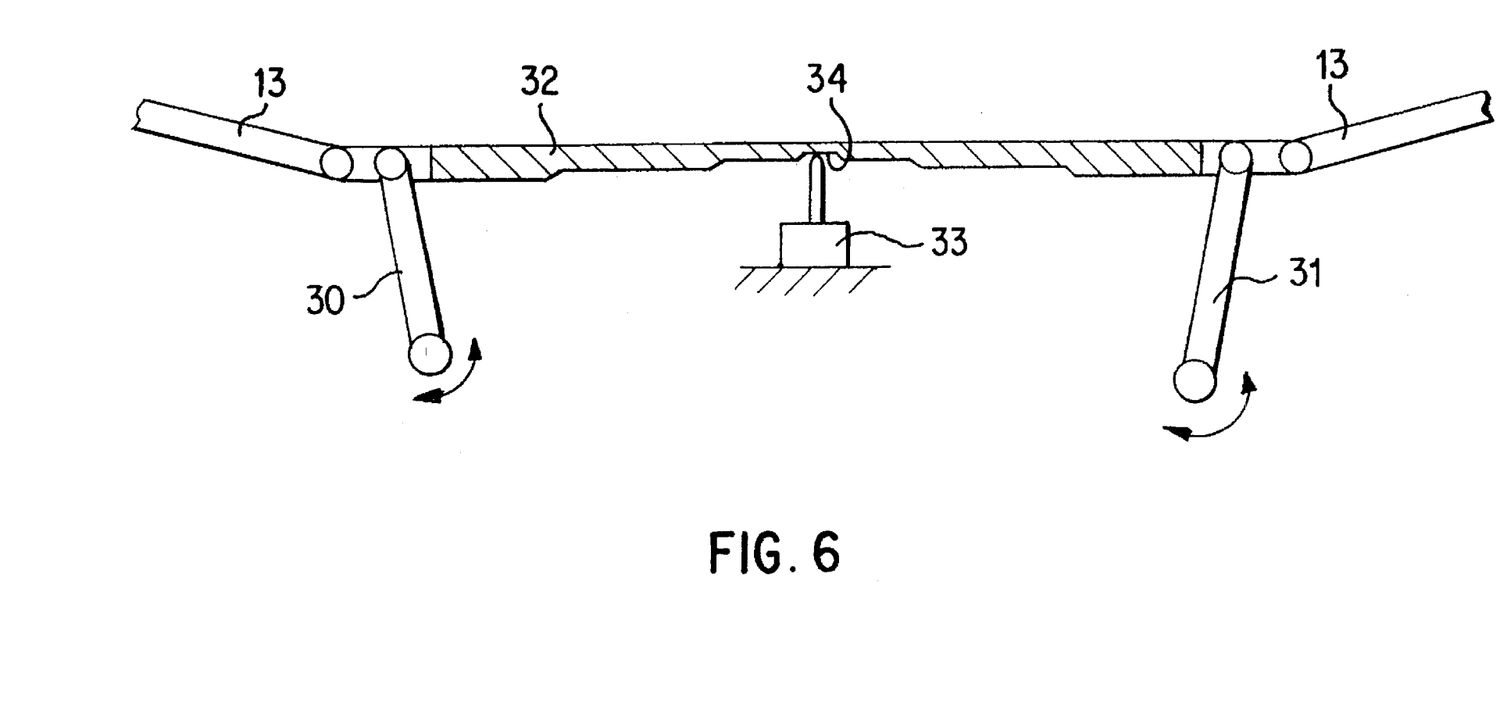
FIG. 6 illustrates a path-dependent control in dependence on the adjustment of a steering rod.

The exemplary embodiment of FIG. 6 provides the same function as the embodiment according to FIG. 5. Instead of a toothed rack, a steering rod 32 can be provided. The steering rod 32 is guided by means of a steering lever 30 or idler arm 31 and is coupled via track rods 13 to the steered wheels (not illustrated) of the vehicle.

Again arranged on one side of the steering rod 32 (or the toothed rack) is a switch 33 which is suitable for generating various signals. The ram-like actuating member of the switch 33 is increasingly pressed in when the steering rod 32 is displaced to the right or left. In this case, the side of the steering rod 32 facing the switch 33 is shaped in steps in such a way that the switch 33 can only assume its one extreme position in the straight-ahead position of the steering system when the ram-like actuating member of the switch 33 engages in a narrow central recess 34 on the steering rod 32. In this extreme position, the control unit 14 switches off the electric motor 5 or allows it to operate on standby operation. With an increasing displacement of the steering rod 32 to the right or left, the switch 33 is increasingly actuated. This has the consequence that the control unit 14 increases the capacity of the electric motor 5 and thus of the pump 6 (FIG. 1). In this case too, path dependent control of the electric motor 5 and pump 6 is again implemented.

Differing from the illustration of FIG. 5, it is also possible to provide only the switch 27 and to omit the switch 29. In this case, the electric motor 5 or the hydraulic pump 6 is always switched to increased capacity whenever the steering wheel is adjusted out of the central position by a specific small amount.

Figure 7:
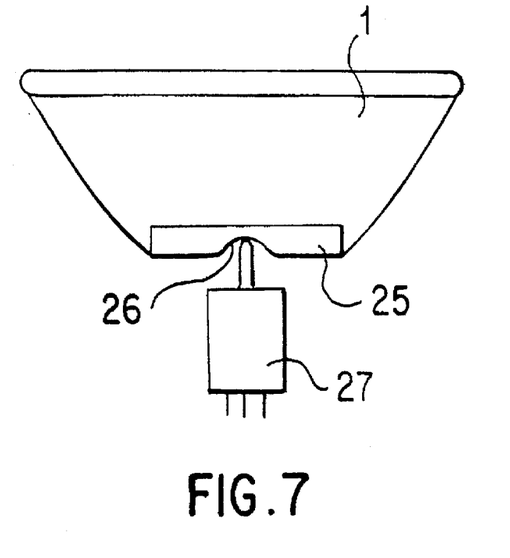
FIG. 7 illustrates a path-dependent control in dependence on the angle of rotation of a steering wheel.

According to FIG. 7, the ram-like actuating member of the switch 27 can also be movable in the axial direction of the steering wheel 1 and can interact with a corresponding axial recess 26 on the rim 25 of the steering wheel 1.

Figure 8:
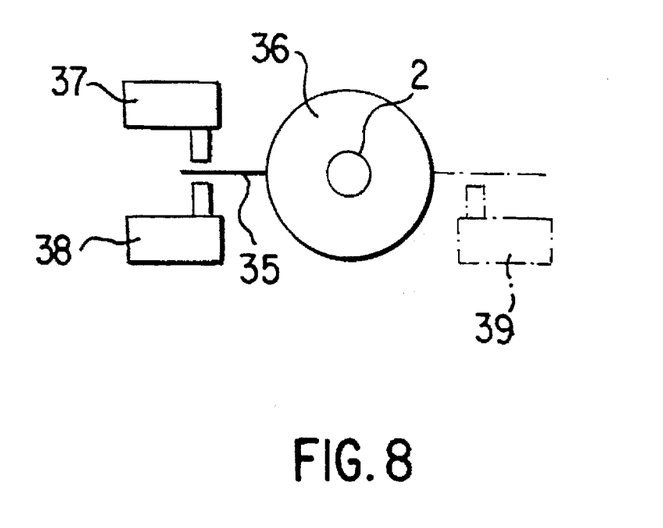
FIG. 8 illustrates a path-dependent control in dependence on the adjustment of the steering wheel which is coupled in terms of drive to switches via a slip clutch.

According to FIG. 8, a lever 35 can be arranged on the steering shaft 2—or on the steering wheel 1—by means of a slip clutch 36 which produces a non-positive connection between the lever 35 and the steering shaft 2 or the steering wheel 1. As soon as the steering wheel 1 is turned, the lever 35 is carried along so that it actuates either the switch 37 or the switch 38, depending on the direction of rotation. The ram-like actuating elements of the switches 37, 38 have a specific spacing from one another so that the lever 35 has a specific amount of room for movement between the switches 37 and 38. If the steering wheel 1 is held steadily and the lever 35 approximately assumes a central position between these switches 37 and 38, both switches remain unactuated, with the consequence that the electric motor 5 and the pump 6 do not operate or operate only on standby operation. As soon as the steering wheel 1 is then actuated, the electric motor 5 and the pump 6 are switched over to increased capacity by one of the switches 37 and 38.

Instead of a single-arm lever 35, a dual-arm lever can also be provided, which then interacts with the switches 38 and 39 basically in a similar manner.

In this way, it is again guaranteed that the hydraulic pump 6 operates at increased capacity when the steering system or the steering wheel 1 is actuated and the servomotor 12 can generate a servo force which assists the respective steering maneuver.

Figure 9:
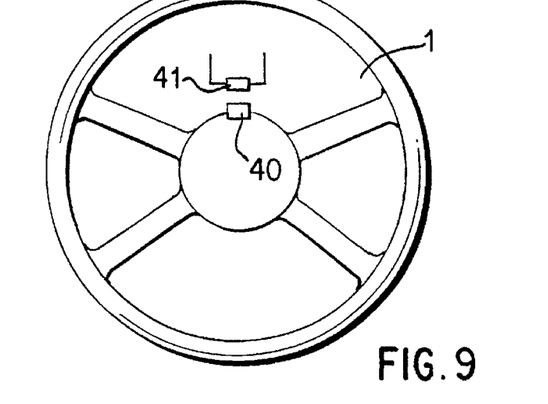
FIG. 9 illustrates a path-dependent control in dependence on the steering wheel position using a reed switch operating without contact.

Instead of mechanically actuated switches, contactless switches can also be provided for switching the electric motor 5 on and off or for switching it over, or as a signal transmitter of the control unit In the example of FIG. 9, a permanent magnet 40 is arranged on a hub part of the steering wheel 1. The permanent magnet 40 interacts with a stationary reed switch 41. When the steering wheel assumes the central position illustrated, the reed switch 41 is in its one state. As soon as the steering wheel 1 is turned and the permanent magnet 40 is thus removed from the reed switch 41, the reed switch 41 moves over into its other state.

Figure 10:
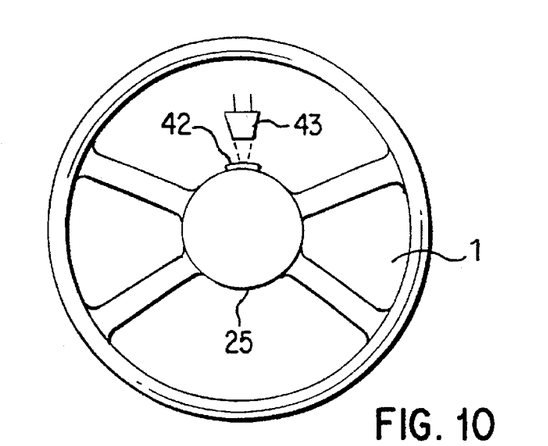
FIG. 10 illustrates a path-dependent control in dependence on the position of the steering wheel using a light barrier arrangement.

In the example of FIG. 10, the annular rim 25 on the hub part of the steering wheel 1 has a circumferential surface designed to reflect light well, and has a comparatively narrow, non-reflecting region 42. In the straight-ahead position of the steering system, the non-reflecting region 42 is located opposite a light emitting and detector unit 43. The unit 43 is designed such that a light beam emitted by the light emitter is reflected from the reflecting region of the circumferential surface of the rim 25 to the detector of the unit 43. If, in contrast, the light beam falls on detecting-reflecting region 42, the light detector of the unit 43 does not "notice" anything. As soon as the steering system is deflected out of the straight-ahead position, a signal is thus generated in this manner in order to switch the electric motor 5 and the pump 6 to capacity operation.

Figure 11:
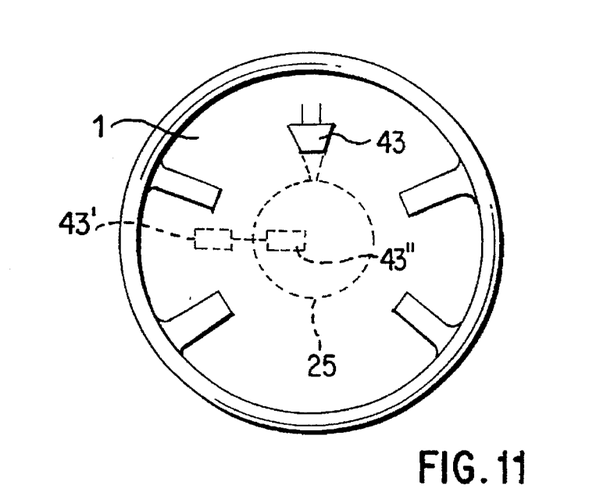

In the embodiment illustrated in FIG. 11, the rim 25 has a circumferential surface with a grid-like pattern of light-reflecting and non-light-reflecting "grid beams". When this grid pattern passes by the light emitting and detector unit 43, the light path between the emitter and the detector is thus alternately interrupted or opened so that the detector of the unit 43 alternately generates signals of one type or the other. The speed of rotation of the steering wheel 1 and thus the speed of actuation of the vehicle steering system can be determined from the temporal sequence of these signals so that the control unit 14 is capable of setting the electric motor 5 and the pump 6 to a greater or lesser capacity in dependence on the speed of actuation.

If appropriate, the rim 25 in FIG. 11 can also have a grid pattern of regions which alternately transmit light and do not transmit light. In this case, the light emitter 43' is arranged on one side of the rim 25 and the detector 43" is arranged on the other side of the rim 25. In this case too, the light path between the emitter 43' and the detector 43" is alternately interrupted and opened when the steering wheel 1 is actuated. Correspondingly, the speed with which the steering wheel 1 is actuated can again be determined in order to be able to control the electric motor 5 and the pump 6 in dependence on the speed of actuation.

The control unit 14 can also take account of any further parameters, e.g. the travelling speed, if appropriate signals are fed to the control unit 14. The capacity of the motor 5 and pump 6, and thus also the servo positioning force generated by the servomotor 12, can thus be changed in dependence on the travelling speed.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A hydraulic power steering system having an operating element, comprising:
   a hydraulic pump;
   a servo valve arranged between a delivery and a suction side of the hydraulic pump and being open in a central or normal position;
   a hydraulic servomotor generating a servo positioning force when the operating element of the power steering system is actuated to facilitate an adjustment of the operating element, wherein the servo valve controls a pressure to at least one connection of the hydraulic servomotor;
   a controllable electric pump drive for driving the hydraulic pump;
   a mechanically actuable electric switch arrangement having actuating members for controlling the electric pump drive, said actuating members being controlled via movements of mechanical components of the power steering system;
   wherein the power steering system is a toothed-rack steering system including a toothed rack arranged so as to be resiliently movable transversely to an axis of a pinion which interacts with said toothed rack, and
   wherein the electric switch arrangement is actuated via transverse movements of said toothed rack.

2. A hydraulic power steering system having an operating element, comprising:
   a hydraulic pump;
   a servo valve arranged between a delivery and a suction side of the hydraulic pump and being open in a central or normal position;
   a hydraulic servomotor generating a servo positioning force when the operating element of the power steering system is actuated to facilitate an adjustment of the operating element, wherein the servo valve controls a pressure to at least one connection of the hydraulic servomotor;
   a controllable electric pump drive for driving the hydraulic pump;
   a mechanically actuable electric switch arrangement having actuating members for controlling the electric pump drive, said actuating members being controlled via movements of mechanical components of the power steering system; and
   wherein the power steering system is a toothed-rack steering system having a stepped recess arranged on a toothed rack, said stepped recess interacting with a switching member of the electric switch arrangement and permitting different switching positions to be set in dependence on an axial stroke of the toothed rack.

3. A hydraulic power steering system having an operating element, comprising:
   a hydraulic pump;
   a servo valve arranged between a delivery and a suction side of the hydraulic pump and being open in a central or normal position;
   a hydraulic servomotor generating a servo positioning force when the operating element of the power steering system is actuated to facilitate an adjustment of the operating element, wherein the servo valve controls a pressure to at least one connection of the hydraulic servomotor;
   a controllable electric pump drive for driving the hydraulic pump;

a mechanically actuable electric switch arrangement having actuating members for controlling the electric pump drive, said actuating members being controlled via movements of mechanical components of the power steering system; and wherein the power steering system is a steering rod system having a stepped recess on one side of a steering rod which is displaceable along its axial length, said stepped recess interacting with a switching member of the electric switch arrangement and permitting different switching positions to be set in dependence on an axial displacement of the steering rod.

4. A hydraulic power steering system having an operating element, comprising:

a hydraulic pump;

a servo valve arranged between a delivery and a suction side of the hydraulic pump and being open in a central or normal position;

a hydraulic servomotor generating a servo positioning force when the operating element of the power steering system is actuated to facilitate an adjustment of the operating element, wherein the servo valve controls a pressure to at least one connection of the hydraulic servomotor;

a controllable electric pump drive for driving the hydraulic pump;

a mechanically actuable electric switch arrangement having actuating members for controlling the electric pump drive, said actuating members being controlled via movements of mechanical components of the power steering system;

a lever arranged on the steering wheel via a slip clutch providing a non-positive connection between said lever and said steering wheel; and first and second switching members of said electric switch arrangement, said lever being arranged between said first and second switching members in order to actuate one of said first and second switches via the movements of said mechanical components of the power steering system to control said electric pump drive.

5. A hydraulic power steering system having an operating element, comprising:

a hydraulic pump;

a servo valve arranged between a delivery and a suction side of the hydraulic pump and being open in a central or normal position;

a hydraulic servomotor generating a servo positioning force when the operating element of the power steering system is actuated to facilitate an adjustment of the operating element, wherein the servo valve controls a pressure to at least one connection of the hydraulic servomotor;

a controllable electric pump drive for driving the hydraulic pump;

a mechanically actuabte electric switch arrangement having actuating members for controlling the electric pump drive, said actuating members being controlled via movements of mechanical components of the power steering system;

a lever arranged on the steering shaft via a slip clutch providing a non-positive connection between said lever and said steering shaft; and first and second switching members of said electric switch arrangement, said lever being arranged between said first and second switching members in order to actuate one of said first and second switches via the movements of said mechanical components of the power steering system to control said electric pump drive.

* * * * *